United States Patent [19]

Kell

[11] 4,267,921
[45] May 19, 1981

[54] ANTI-BACKBEND BELTS

[75] Inventor: Ralph W. Kell, Lincoln, Nebr.

[73] Assignee: The Goodyear Tire & Rubber Company, Akron, Ohio

[21] Appl. No.: 115,829

[22] Filed: Jan. 28, 1980

Related U.S. Application Data

[62] Division of Ser. No. 944,485, Sep. 21, 1978.

[51] Int. Cl.³ .................. B65G 15/34; B65G 23/14
[52] U.S. Cl. .................................. 198/847; 198/833
[58] Field of Search ............ 198/847, 845, 833, 844; 74/231 R, 231 J, 231 C, 231 N, 237

[56] References Cited

U.S. PATENT DOCUMENTS

| | | | |
|---|---|---|---|
| 2,735,537 | 2/1956 | Keller | 198/833 |
| 3,967,720 | 7/1976 | Arieh | 198/847 |
| 4,179,025 | 12/1979 | Piette et al. | 198/833 |

FOREIGN PATENT DOCUMENTS 1414026 9/1965 France ........................ 198/833

Primary Examiner—Robert B. Reeves
Assistant Examiner—Brian Bond
Attorney, Agent, or Firm—D. M. Ronyak

[57] ABSTRACT

Endless, flexible anti-backbend belts having a molded elastomeric body are disclosed and comprise a plurality of longitudinal high tensile modulus cords embedded in the belt near the inside surface and a layer of substantially incompressible material facing outwardly and forming the outside surface of the belt. When the belt is in a straightened position, the incompressible material provides a resistance to backbending. Other embodiments are also disclosed that operate in combination with drive lugs on the inside surface of a conveyor belt, and the separation of the tensile cords of the conveyor and anti-backbend belts provide a resistance to backbending such as to support the conveyor in the area between its drive and take-up pulleys.

5 Claims, 13 Drawing Figures

ANTI-BACKBEND BELTS

This is a Division, of application Ser. No. 944,485 filed Sept. 21, 1978.

BACKGROUND OF THE INVENTION

This invention relates generally to flexible belts and more particularly to a belt that exhibits an anti-backbending characteristic that is useful in conveyor type applications.

Belts having an anti-backbend characteristic are useful in various applications wherein the belt must support a certain load carried by it, as for example conveyor belts. This invention is applied to those type applications wherein either the belt alone must support the load carried by it or it is applied as a secondary support means wherein a first conveyor is a primary driven belt and carries the load but wherein a secondary belt is used to support the primary belt when the load is applied in the area between the drive and take-up pulleys. An application of this latter type is described in a co-pending application entitled, "Tracked Vehicle Suspension" and filed concurrently herewith. In that application a suspension system is described wherein the primary belt is a snowmobile snowtrack and it is supported on the ground side by a secondary belt that is positioned inside of the track, along its path of travel, and engaged and driven by the track but which presents a resistance to back bending and thus holds the track to the ground as it follows the terrain.

The belt of this invention is designed to operate either singly or in combination with a primary conveyor and is contrasted to other types of belts in the art by virtue of the fact that the compression section of the belt faces outwardly of the pulley axes and of its path of travel rather than inwardly as is conventional. In this circumstance the tension member is closest to the inward facing surface that engages the pulley, while the compression section comprises substantially incompressible material and is closest to the outward facing surface of the belt.

A principal object of the invention therefore is to provide a belt that is flexible when passing around pulleys but which presents a resistance to backbending when straightened out between the pulleys. The foregoing and other objects and advantages are accomplished in an anti-backbending belt comprising: an endless flexible belt for operation between at least two pulleys and having a molded elastomeric body and opposite inside and outside face surfaces of which the inside surface is directed toward the pulley axes when the belt is in use, said belt comprising a plurality of longitudinal high tensile modulus cords embedded in the belt nearer the inside surface and a layer of substantially incompressible material facing outwardly and forming the outside surface, said incompressible material comprising at least 50% of the total surface-to-surface thickness of said belt to provide an anti-backbend characteristic to the belt when it is in its straightened position between the pulleys.

BRIEF DESCRIPTION OF THE DRAWINGS

The features of the invention will become more fully apparent from the detailed description that follows in conjunction with the accompanying drawings in which.

DESCRIPTION OF THE INVENTION

Figure 11:
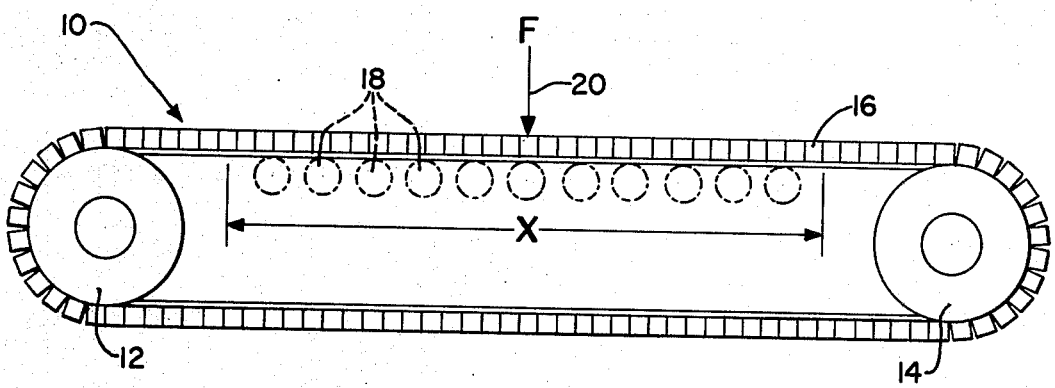
FIG. 11 is an elevational view of a conveyor system utilizing the anti-backbend belt of this invention.

Referring firstly to FIG. 11, a conveyor utilizing the teaching of this invention is generally indicated by reference numeral 10 and comprises a drive pulley 12, a take-up pulley 14, and a belt 16. Conventional conveyor systems generally utilize a plurality of idler rollers 18 (shown in ghost lines) to provide support to the belt in the area between the pulleys and designated "x" in the drawing. This invention provides a belt 16 that exhibits an anti-backbend characteristic such that the requirement for some if not all of the idlers 18 may be obviated. To accomplish this, the belt 16 must be of such construction and design so as to be flexible around the pulleys 12, 14 but must also present a resistance to bending when it straightens out between the pulleys in opposing a load force F acting in the direction of arrow 20. While the conveyor 10 may be applied to many and various applications as a primary conveyor as illustrated in FIG. 11, it may also be applied to applications as a secondary conveyor as illustrated in FIG. 12.

Figure 12:
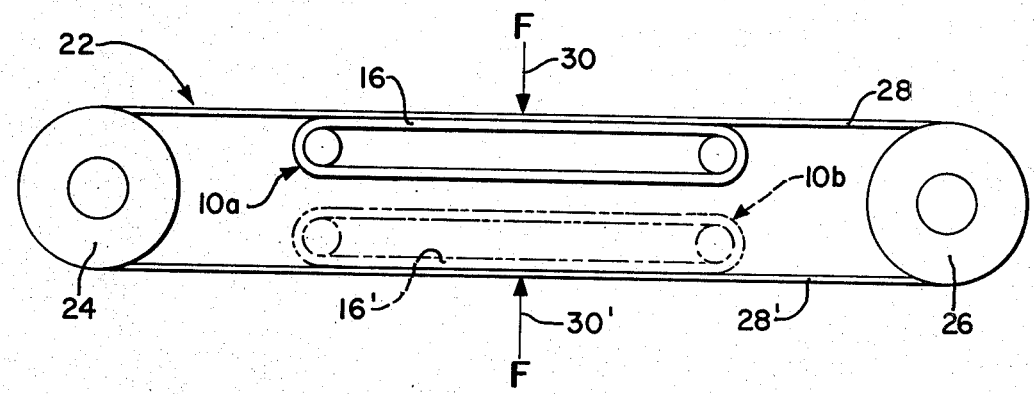
FIG. 12 illustrates a further application of the anti-backbend belt wherein it is applied as a secondary support conveyor for a primary conveyor.

Referring to FIG. 12, a primary conveyor is generally indicated by reference numeral 22 and the system includes a drive pulley 24, a take-up pulley 26, and a belt 28. Mounted within the inside pathway of the belt 28 is a secondary conveyor 10a similar to that shown in FIG. 11 and its purpose is to support the belt 28 by virtue of its anti-backbend characteristic. The secondary conveyor 10a thus eliminates a plurality of idler rollers 18 in its area of influence on the belt 28 and maintains it in its proper horizontal position in carrying a load indicated by force arrow 30. As herebefore mentioned, the belt of this invention may be applied to various type conveyors and the support of snowmobile snowtracks is no exception. As shown in FIG. 12 by the ghost line showing 10b, the secondary conveyor may be positioned on the bottom inside pathway of the conveyor (i.e., snowtrack) to hold the belt 28' in a position to oppose a force acting in the direction of arrow 30'. In a snowtrack application the anti-backbend belt 16' will hold the track 28' to the ground as it conforms to the terrain. A full description of this type application is described in the before-mentioned co-pending application.

Figure 1:
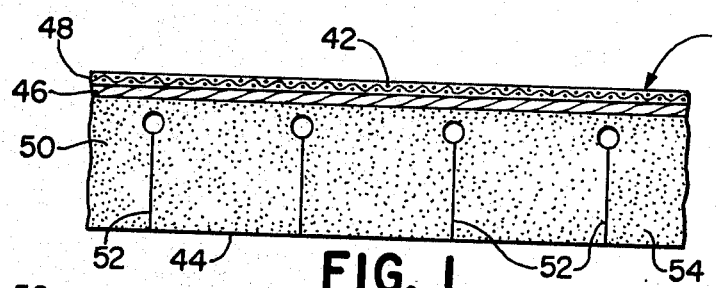
FIG. 1 is an elevational view of an anti-backbend belt that meets the needs of the invention, the inside surface of the belt being at the top of the drawing.
Figure 2:
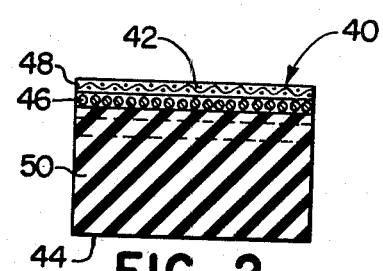
FIG. 2 is an elevational transverse sectional view of the belt of FIG. 1.

Turning now to FIGS. 1 and 2, a belt that meets the needs of the invention is generally indicated by reference numeral 40. The inside surface of the belt, i.e., the portion that contacts the pulleys, is indicated by numeral 42 while the outside surface is indicated by reference numeral 44. The belt 40 is of a flat type configuration either rectangular or trapezoidal in cross-section and is made by conventional belt building techniques. The materials that comprise the belt structure are conventional in the belt building art also and the invention is not considered limited in any way by the type of material used. For example, the belt structure may comprise a cushion section having a plurality of cords 46 embedded therein which cords may be nylon, polyester, rayon, glass, steel or aramid, or any equivalent multifilament or mono-filament cord. Preferably, the cords 46 exhibit a high tensile modulus and are located near the inside surface 42 of the belt. The plies above the tensile cords 46 may be of the elastomer that comprises the cushion section or, may include an abrasion-resistant bias or square-woven fabric 48 embedded in an appropriate elastomer while the ply to the outside of the tensile cords 46 may comprise a solid or fiber-loaded stock 50 that resists compression. In this circumstance the section indicated by reference numeral 50 is a substantially incompressible material and may be siped as at 52 for more flexibility around the pulleys, and when the belt straightens out between the pulleys the blocks 54 formed by the sipes 52 are wedged end-to-end against each other and thus an anti-backbending characteristic is accomplished.

Figure 3:
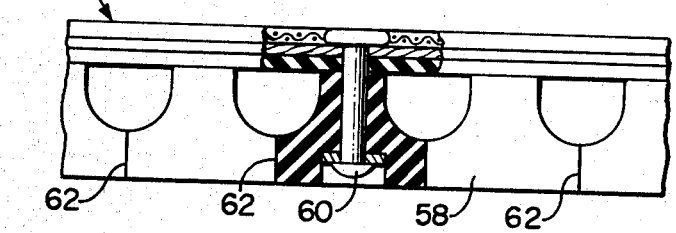
FIG. 3 is an elevational view, partially in section, of a second embodiment of an anti-backbend belt.

FIG. 3 illustrates an anti-backbending belt 56 similar to that shown in FIG. 1 but having blocks of material 58 that are attached to the belt body by fasteners 60. The blocks may be of various sizes, shapes and materials but must be in an abutting relationship at 62 and be of substantially incompressible material so as to accomplish an anti-backbending characteristic.

Figure 4:
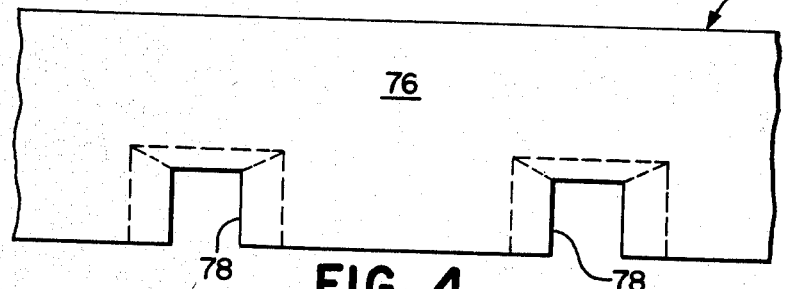
FIG. 4 is a plan view taken from the inside surface of a belt showing notches or slots along one side thereof for engagement with drive lugs on a conveyor to accomplish an anti-backbend characteristic from the combination of the two belts.
Figure 5:
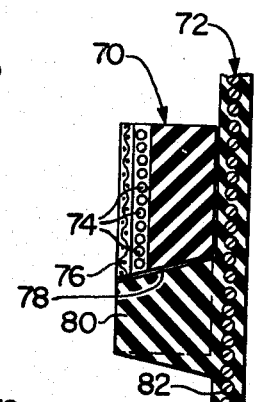
FIG. 5 is an elevational transverse sectional view of the belt of FIG. 4 showing a conveyor or track in engagement therewith.
Figure 6:
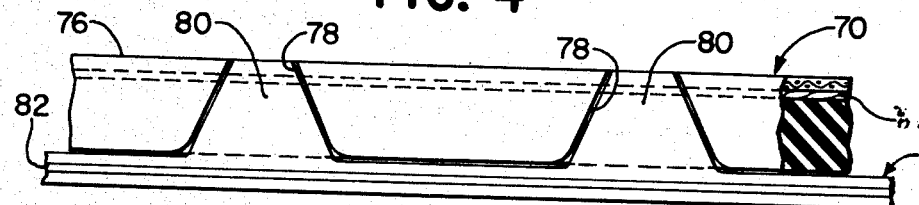
FIG. 6 is a side elevational view of the belt and conveyor combination shown of FIG. 5.

FIGS. 4, 5 and 6 illustrate an embodiment of the invention wherein substantially flat configured belt 70 is adapted for driving engagement with a conveyor 72. Similarly to the belt 40 of FIG. 1, the belt 70 is characterized by high tensile modulus cords 74 being located near the inside surface 76 of the belt. The belt 70, however, contrasts with the belt 40 in the manner of achieving an anti-backbending characteristic. The belt 70 is thus characterized by notches or slots 78 that are shaped to engage drive lugs 80 on the inside surface of the conveyor 72. The notches 78 increase the flexibility of the belt when passing around pulleys but when in engagement with the conveyor lugs 80 the combination of the two belts and in particular the separation of the tensile members of the belts result in a very stiff section that accomplishes an anti-backbending characteristic. The extremely stiff combination results from a tensile cord separation of at least 50% of the combined surface-to-surface thickness. Thus, the separation of the tensile cords 74 of the belt 70 and the tensile cords 82 of the conveyor 72 and the locking engagement of the two belts by reason of the drive lug and notch combination effect an anti-backbend characteristic. It should be noted that the belt 70 is not as thick as the belt 40 and also is not siped, the notches 78 providing the flexibility necessary for passing around the pulleys.

Figure 7:
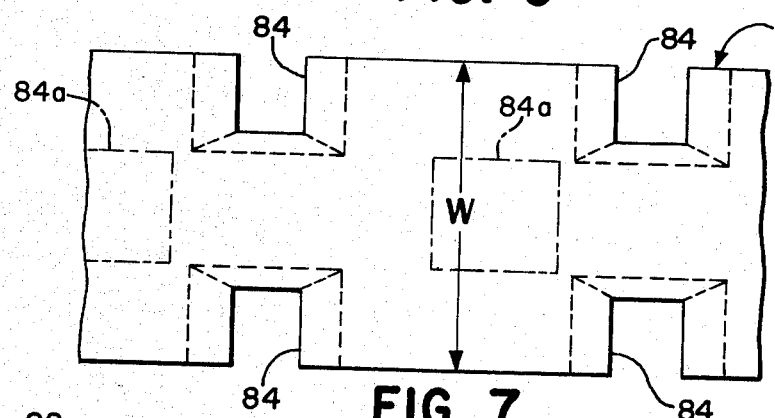
FIG. 7 is a plan view similar to that of FIG. 4 but with the belt having engaging notches along both sides of the belt.
Figure 8:
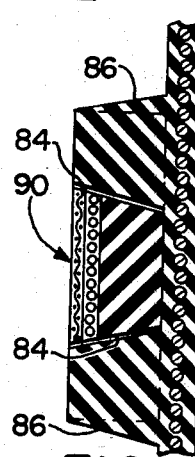
FIG. 8 is an elevational transverse sectional view of the belt of FIG. 7 showing a conveyor or track in engagement therewith.

FIGS. 7 and 8 illustrate a belt 90 similar to that shown in FIG. 4 but with notches 84 on both sides thereof for engagement with drive lugs 86 on a conveyor 88. This belt accomplishes an anti-backbend characteristic in the same manner as the belt 70 and its flexibility is increased further by virtue of the double set of notches. The belt 90, however, still presents an extremely stiff section when combined with the drive lugs on the conveyor and in this embodiment the belt width "w" is increased somewhat to accommodate the double notches and to increase the contact surface with the conveyor 88.

It is also envisioned that the side notches 84 may be replaced by centrally located holes 84a (shown in ghost lines) that engage a single row of drive lugs 86 on the conveyor 88 and thus accomplish interlocking of the two belts and an anti-backbend characteristic in a similar manner as herebefore discussed with reference to FIGS. 4 and 7.

Figure 9:
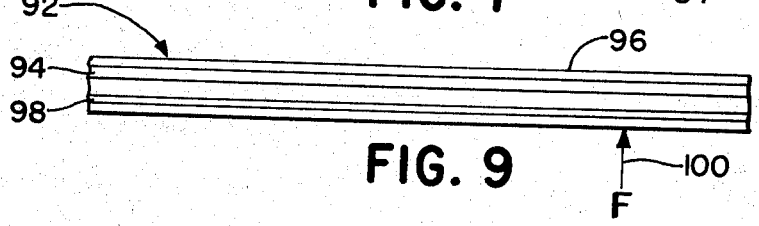
FIG. 9 is a side elevational view of still another embodiment for an anti-backbend belt.
Figure 10:
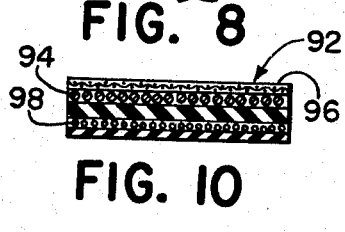
FIG. 10 is a transverse elevational sectional view of the belt of FIG. 9.

FIGS. 9 and 10 illustrate still another embodiment of an anti-backbend belt 92 that is characterized by very high modulus tensile cords 94 positioned close to the inside surface 96 of the belt. Spaced outwardly from the tensile cords 94 is a series of low modulus monofilaments 98 that have a resistance to compression such as, for example, nylon or polyester monofilaments. The monofilaments will thus stretch when passing around pulleys but will resist compression when straightened out between the pulleys and a backbending load F is applied in the direction of arrow 100.

Figure 13:
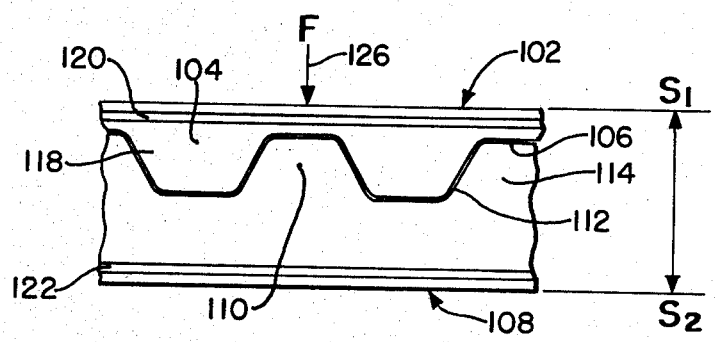
FIG. 13 illustrates an embodiment comprising a primary positive drive conveyor and a secondary positive drive belt co-acting to achieve an anti-backbend characteristic.

Still another embodiment of the invention is illustrated in FIG. 13 wherein a positive drive type belt 102 is a primary conveyor having transverse lugs 104 and grooves 106 which engage a secondary belt 108 that is also a positive drive type belt having lugs 110 and grooves 112. The two belts 102 and 108 are in matched lug-groove engagement by reason of the positioning of the secondary belt 108 such that the lugs are outwardly facing with respect to the pulley axes. In this circumstance the secondary belt is characterized by a compression section 114 comprised of a substantially incompressible material while the conveyor 102 is a conventional type belt having a cushion compound in its compression section 118 that is inwardly facing to engage a drive pulley in a positive drive configuration. The lug-groove engagement of the two belts and the displacement of the high modulus tensile cords 120 and 122 respectively results in a very stiff section that resists backbending in the direction of force arrow 126. As in the embodiments of FIGS. 1–10 the tensile cores 120, 122 must be separated by a distance equal to at least 50% of the surface-to-surface separation $S_1$ to $S_2$ of the two belts.

While certain representative embodiments and details have been shown for the purpose of illustrating the invention, it will be apparent to those skilled in this art that various changes and modifications may be made therein without departing from the spirit or scope of the invention.

I claim:
1. Endless flexible belt means for operation between a plurality of pulleys including at least one flexible belt having an elastomeric body and opposite inside and outside face surfaces, the inside surface of any belt of said belt means being directed toward the pulley axes when the belt means are in use, said one belt including a plurality of longitudinally extending high tensile modulus cords embedded in said one belt nearer the inside surface and a layer of substantially incompressible material facing outwardly and forming the outside surface, said incompressible material facing outwardly of said inside face surface, said incompressible material comprising at least 50% of the total outside surface-to-inside surface thickness of said one belt to provide an anti-backbend characteristic to the belt means when it is in its straightened position between said pulleys, said endless flexible belt means further including a conveyor belt including drive lugs on its inside surface and longitudinally extending tensile cords, said conveyor belt operable between a conveyor drive pulley and a take-up pulley, said one belt providing for support of said conveyor in an area between said conveyor drive pulley and take-up pulley, said one belt having a plurality of notches located along at least one lateral edge thereof and extending completely through from the inside surface to the outside surface thereof in a position capable of alignment with the conveyor belt drive lugs so as to be in engagement therewith, said one belt operable between at least two pulleys mounted on the inside pathway of said conveyor belt in proximate position between said conveyor drive and take-up pulleys so as to become engaged with said drive lugs on the inside surface of said conveyor belt and to run in drive synchronism therewith, the combination of interlocked notches and the separation of the tensile cords of said one belt and said conveyor belt providing an anti-backbend characteristic that supports a load on the surface of said conveyor belt.

2. The belt means as set forth in claim 1 wherein the lugs of said conveyor belt completely fill the notches of said one belt when fully engaged therewith.

3. The belt means as set forth in claim 1 wherein said notches are located along both lateral edges of said belt for engagement with mating drive lugs on the conveyor belt.

4. The belt means as set forth in claim 1 wherein the outside layers of said one belt comprise a high density fiber-loaded elastomeric compound that resists compression.

5. The belt means as set forth in claim 1 wherein the incompressible outside layer of said one belt comprises between 50-75% of the total thickness of said one belt.

* * * * *

UNITED STATES PATENT AND TRADEMARK OFFICE
CERTIFICATE OF CORRECTION

PATENT NO. : 4,267,921
DATED : May 19, 1981
INVENTOR(S) : Ralph W Kell

It is certified that error appears in the above-identified patent and that said Letters Patent are hereby corrected as shown below:

Column 2, line 19, after "having" insert -- drive --.

Signed and Sealed this

Twenty-ninth Day of December 1981

[SEAL]

*Attest:*

GERALD J. MOSSINGHOFF

*Attesting Officer*     *Commissioner of Patents and Trademarks*